Dec. 24, 1957   R. LORMEAU   2,817,255
WIRE STRIPPING TOOL
Filed Dec. 20, 1954   3 Sheets-Sheet 1

INVENTOR
René LORMEAU
BY
ATTORNEYS

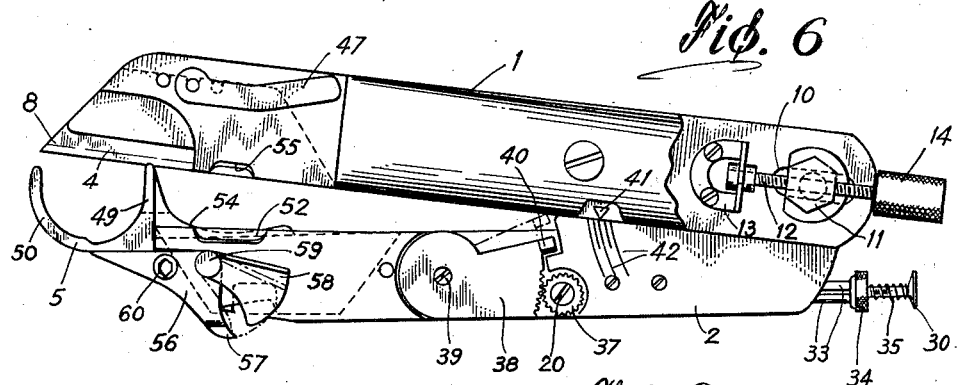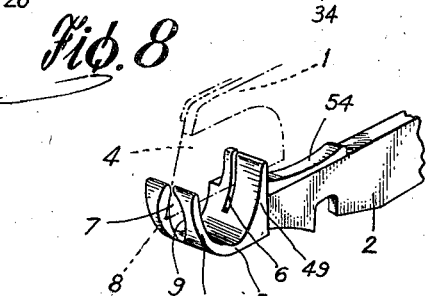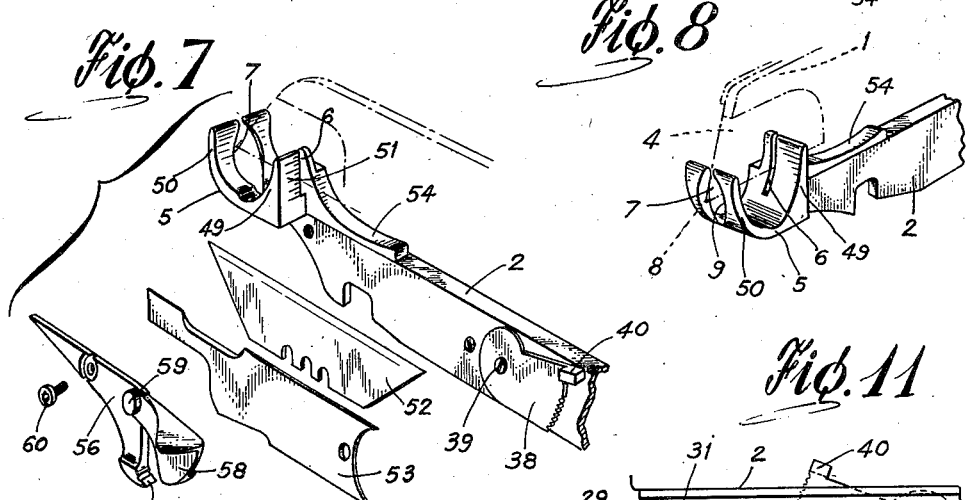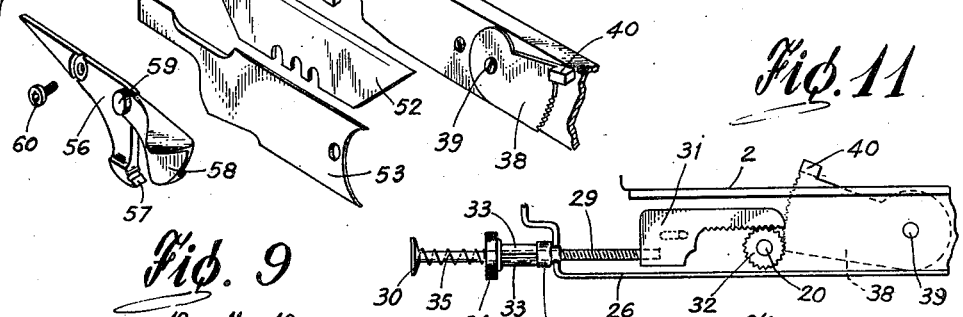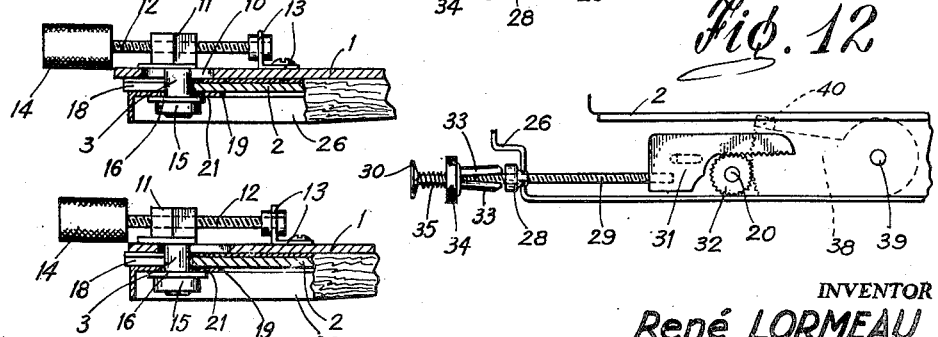

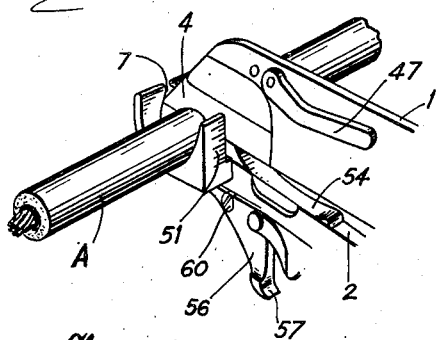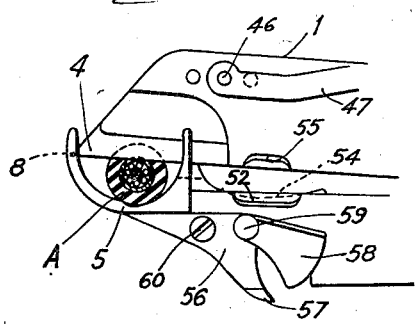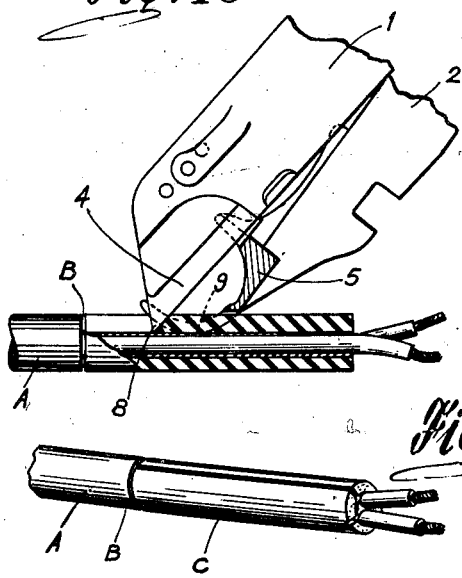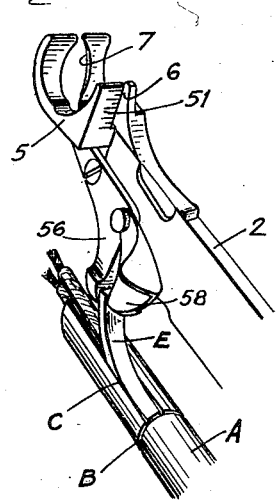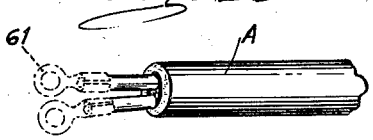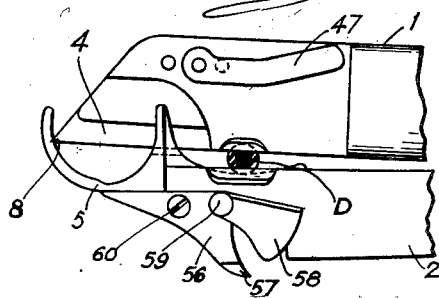

United States Patent Office 2,817,255
Patented Dec. 24, 1957

2,817,255

WIRE STRIPPING TOOL

René Lormeau, Montreal, Quebec, Canada

Application December 20, 1954, Serial No. 476,212

11 Claims. (Cl. 81—9.5)

The present invention relates generally to a cutting device and more particularly to a tool designed for stripping the insulation and covering of electric wires or cables in order to expose the wires.

The main object of the present invention is the provision of a wire stripping tool of the character described adapted for cutting the insulation or sheathing circumferentially and also longitudinally in order that the insulation or sheathing may be easily and quickly removed therefrom.

Another important object of the present invention is the provision of a wire stripping tool of the character described which is adapted to strip conductors of various diameters and which may also be used for stripping flat cables.

Yet another important object of the present invention is the provision of a wire stripping tool of the character described provided with means for adjusting the depth of cut of the blade, both for circumferential and longitudinal cuts in order to prevent damage to the inner insulation of the conductors of a multiple conductor cable.

Yet another important object of the present invention is the provision of a tool of the character described having means to quickly alter the adjustment of the tool to thereby enable said tool to cut in succession cables of largely varying diameters, or to quickly change from a longitudinal to a circumferential cut and vice versa.

Still another important object of the present invention is the provision in a tool of the character described of means for the quick and easy replacement of the blades.

Yet another important object of the present invention is the provision of a tool of the character described in which the two arms may be quickly disassembled whereby one arm of said tool may be used as an ordinary jack knife for cutting the strings and cotton which often form part of the cable sheathing.

Another important object of the present invention is the provision in a tool of the character described of gripping means for gripping and removing the cut strips of the insulation and sheathing.

The foregoing and other important objects of the present invention will become more apparent during the following disclosure and by referring to the drawings in which:

Figure 6 is an elevation of the tool in a position for cutting cables of relatively large diameter;

Figure 7 is an exploded perspective view of the operative end of one arm of the tool;

Figure 8 is a partial perspective view of said same operative end of the tool;

Figures 9 and 10 are longitudinal sections of the pivoted ends of the arms of the tool shown in two different longitudinally adjusted positions;

Figures 11 and 12 are elevations of the means for adjusting the cutting depth of the blade when making circumferential cuttings, shown in two different adjusted positions;

Figure 13 is a partial perspective view showing how the tool is used for making a circumferential cut in a cable;

Figure 14 is a side elevation corresponding to Figure 13, showing the cable in cross-section;

Figure 15 is a partial elevation of the tool showing how the same is used for making a longitudinal slit in the cable;

Figure 16 is a partial perspective view of the tool showing how the same is used to remove the cut insulation strips;

Figure 17 is a partial perspective view of a cable or wire that has been cut and slit with the tool of the present invention prior to the removal of the cut insulation strips;

Figure 18 is a view of a wire which has been stripped with the tool according to the present invention;

Figure 19 is a partial elevation of the tool showing how the same is used for stripping wires or cables of relatively small diameter.

Figure 1:
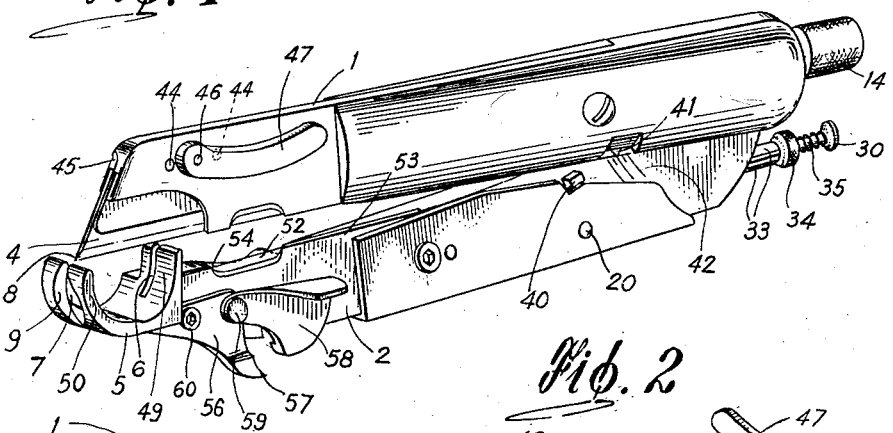
Figure 1 is a perspective view of the tool according to the present invention.

Referring now more particularly to the drawings in which like reference characters indicate like elements throughout, the tool comprises two substantially coextensive arms 1 and 2 pivoted one to the other at one of their ends by means of a pivot bolt 3 for movement towards and away from each other in substantially the same plane.

The arm 1 carries a blade 4 at its outer end, while the outer end of the arm 2 is provided with a cable supporting member 5 having slits 6 and 7 made therein for receiving the blade 4 in such a way that said blade 4 will extend across the support member 5 and also will have its tip 8 projecting through the outer slit 7 into a recess 9 made in the outer face of the outer side wall of the support member 5. To make a circumferential cut B in the cable A, said cable A is inserted within the support member 5, as shown in Figures 13 and 14, and the arm 1 is pivoted close to the arm 2 with the blade 4 engaging the slits 6 and 7 and pressed against the cable A, while rotating the tool around said cable A. Once the circumferential cut B is made, the tool is used as shown in Figure 15 to make the longitudinal cuts C in the cable A. The cable A is laid on a suitable support and is placed in the recess 9 of the support member 5. The tip 8 of the blade 4, which projects into the recess 9, will thus engage the cable and will cut the insulation B as the tool is longitudinally slid along said cable.

Figure 4:
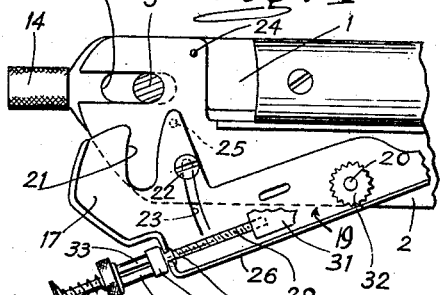
Figure 4 is an elevation of said pivoted ends of the arms of the tool in disassembled position.
Figure 5:
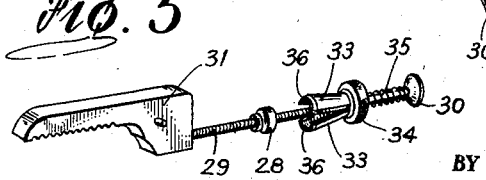
Figure 5 is a perspective view of the quick release means for the adjustment of the cutting depth of the blade when making peripheral cuts.

The arm 1 is provided at its pivoted end with a longitudinally extending slot 10 which is engaged by the pivot bolt 3. The position of the bolt 3 within the slot 10 may be adjusted by the means more particularly shown in Figures 9 and 10. The bolt 3 has a head 11 provided with a transverse threaded bore for receiving a screw 12 extending longitudinally of the arm 1 and journalled at one end on bracket 13 and provided with knob 14 at its other end. The other end of the pivot bolt 3 is provided with a nut 15 and a washer 16. The arm 2 is provided at its pivoted end with a lateral projection 17 provided with a notch 18 extending along an axis parallel to the longitudinal axis of said arm 2 and adapted to removably engage the pivot bolt 3. An L-shaped locking member 19 is pivoted on the arm 2 by means of a pivot axle 20 and is provided with an arcuate notch 21 at its upper end adapted to engage the pivot bolt 3 and thereby lock the arm 2 onto said pivot bolt 3. To remove the arms 1 and 2 from pivotal engagement, the locking member 19 is simply pivoted outwardly, as shown in Figure 4, whereby its notch 21 clears said pivot bolt 3 and enables the pivot bolt 3 to disengage the notch 18 of arm 2.

A screw 22 secured to the arm 2 and engaging an arcuate slot 23 made in the locking member 19 serves to guide the pivotal movement of the latter relative to said arm 2. When the arms 1 and 2 are pivotally connected together by means of the pivot bolt 3, rotation of the manipulating knob 14 causes longitudinal adjusting movement of the arm 1 relative to the arm 2 and consequently relative longitudinal displacement of the blade 4 within the support member 5 to thereby adjust the extent of projection of the tip 8 of the blade 4 into the recess 9 of the support member 5. These adjustment means allow the variation of the depth of cut of the tool when making longitudinal cuts C in the cable A. This depth of cut is measured by the pointer 41 marked on the arm 1 and adapted to register with the graduations 42 of a scale marked on the arm 2, as shown in Figure 6.

In order to maintain the locking member 19 in locking position over the bolt pivot hole 3, the arm 2 is provided with a small boss 24 adapted to engage a depression 25 made in the locking member 19.

The locking member 19 further carries means for adjusting the mutual angular positions of the arms 1 and 2 to thereby adjust the cutting depth of the blade when making peripheral cuts B in the cable A.

The locking member 19 is provided with an outwardly directed flange 26 which has a circular notch 27 engaged by a collar 28. A screw 29 freely passes through the collar 28, is provided at its outer end with a knob 30 and is connected at its inner end to a rack member 31, the teeth of which engage a pinion 32 which is secured to the pivot axle 20. Two half cylindrical members 33 surround the screw 29 and are pivotally mounted at one end within a knurled ring 34 which is spring urged by means of coil spring 35 towards the rack member 31. The two half cylindrical members 33 are provided with inner threads adapted to threadedly engage the screw 29 when said half cylindrical members 33 are maintained one against the other by having their bevelled outer ends 36 engaging a recess made in the collar 28. Rotation of the knurled ring 34 will then rotate said half cylindrical members 33 relative to the screw 29 and displace the latter longitudinally to thereby rotate the pinion 32 through the means of the rack member 31. When it is desired to release the screw 29, the knurled ring 34 is simply pulled towards the knob 30 against the action of the spring 35 thereby disengaging the half cylindrical members 33 from the thread of said screw 29, and the latter is free to be displaced longitudinally to any new adjusted position.

As shown in Figures 6 and 7, a second pinion 37 is secured to the pivot axle 20 on the other side of the lower arm 2 and is in meshing engagement with a toothed sector 38 which is pivoted to said arm 2 by means of bolt 39. The toothed sector 38 carries an abutment 40 adapted to engage the inner edge of the arm 1 to form a stop for said arm 1 when the latter is pivoted towards the arm 2 about the pivot bolt 3. Thus rotation of the knurled ring 34 will displace the toothed sector 38 and consequently the abutment 40, to thereby adjust the limit closing position of the arms 1 and 2.

The blade 4 has preferably a trapezoidal shape to form two pointed tips 8 and is, therefore, reversible so that the second tip may be used when the first is worn out. The non-cutting edge of the blade is provided with three notches 43 as clearly shown in Figure 2. Pins 44 secure a clamping plate 45 to the arm 1 and the blade 4 is adapted to be inserted into the cavity between said arm 1 and clamping plate 45 with its two outside notches 43 engaging said pins 44.

The blade 4 is firmly clamped in place by means of the bolt 46 passing through the centre notch 43 of the blade 4 and by means of a lever arm 47 which threadedly engages said bolt 46.

Figure 2:
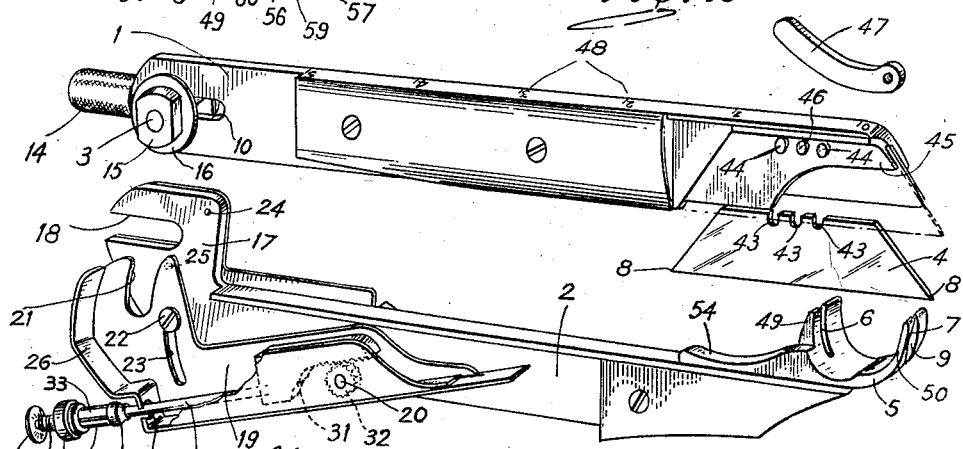
Figure 2 is an exploded perspective view of said tool.
Figure 3:
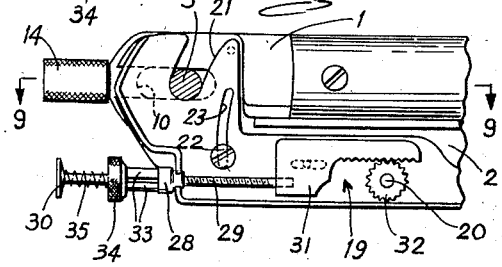
Figure 3 is an elevation of the pivoted ends of the arms of the tool in assembled position.

As shown in Figure 2, the arm 1 may be provided along its top edge with a scale 48 for measuring the length of the cable portion to be stripped.

The support member 5 is mounted at the outer end of the arm 2 and consists in a semi-cylindrical or curvilinear collar which forms an upstanding inner side wall or jaw 49 and an upstanding outer side wall or jaw 50 in which are made the slits 6 and 7 respectively. The recess 9 surrounds the slit 7 and is made in the outer face of the outer side wall 50. The outer face of the inner side wall 49 is provided with a scale 51, as shown in Figure 7, for measuring the extent of engagement of the blade 4 within the slits 6 and 7 in order to measure the depth of the peripheral cut B made in the cable A by said blade 4.

The arm 2 is further provided with a second blade 52 similar in shape to the blade 4 and secured against a side of the arm 2 adjacent the support member 5 by means of the retaining plate 53. The cutting edge of the blade 52 is adapted to project outwardly from a slightly curved part 54 of the inner edge of the arm 2 and is adapted to cooperate with an opposite portion of the cutting edge of the blade 4 which projects from a recess 55 of the arm 1. The blade 52, in co-operation with the opposite portion of the blade 4, serves to make peripheral cuts in small diameter wires or cables D, as shown in Figure 19. Due to the fact that two blades are co-operating to make the cut, it is necessary to make only half a rotation of the tool, according to the present invention, relative to the small cable D in order to make a complete peripheral cut in said small cable D.

The tool, according to the present invention, is provided with gripping means for pulling away the cut insulation strips E which may still adhere to the cable, as shown in Figure 16. Said gripping means comprise a fixed gripping claw 56 which is secured to the arm 2 adjacent the support member 5, the pointed tip 57 of which is adapted to co-operate with the tip of a lever claw 58 which is pivoted at 59 on the claw 56. As shown in Figure 7, the blade 52, retaining plate 53 and claw 56 are secured to the arm 2 by means of bolt 60. As shown in Figure 18, the tool, according to the present invention, can strip the outer sheathing of the cable A without damage to the inner insulation of the individual wires of the cable, while said inner insulation may be partly removed by means of the blades 4 and 52 as shown in Figure 19, for the insertion into connectors 61. Of course, the tool, according to the present invention, may be also used for stripping part of the cable along any portion thereof for making a tap connection.

While a preferred embodiment according to the present invention has been illustrated and described, it is understood that various modifications may be resorted to without departing from the spirit and scope of the appended claims.

I claim:

1. An insulation cutting and stripping tool comprising two substantially coextensive and adjacent arms pivotally interconnected at one end, means for adjustably and longitudinally displacing one arm relative to the other, a cutting blade carried by at least one of said arms, a support member provided with slits mounted on the other of said arms, said blade being engageable with the slits of said support member and adapted to project outwardly from said support member through said slits, said first named means regulating the extent of projection of said blade from said support member, adjustable abutment means to limit the pivotal movement of said arms towards each other thereby to adjust the extent of engagement of said blade within said slits, said means for longitudinally displacing one arm relative to the other comprising a threaded head at one end of a pivot bolt constituting the pivotal connection of said two arms, a screw threadedly engaging said head, a bracket secured to one of said arms in which said screw is journalled, said one arm having a longitudinal slot in which said pivot bolt passes, the other of said arms having a recess for engaging said bolt, a locking member pivoted to the other of said arms and provided with a notch extending transverse to the recess of said other arm and adapted to engage said pivot bolt when said locking member is pivoted towards said recess, and a knob for rotating said screw.

2. A tool as claimed in claim 1, wherein said adjustable abutment means comprises a sector shaped toothed member pivotally mounted on one of said arms and adapted to abut the other of said arms, a pinion meshing with the teeth of said sector shaped member and means for adjustably rotating said pinion to adjust the angular position of said toothed member.

3. A tool as claimed in claim 2, wherein said last named means include a second pinion, a rack member meshing with said second pinion, a screw secured at one end to said rack member and provided with a knob at its other end, an inwardly threaded split sleeve surrounding said screw, and means to urge said split sleeve to engage said screw, whereby rotation of said screw engaging said split sleeve will cause axial displacement of said screw.

4. A tool for cutting and stripping insulation from a wire core and like carrier, comprising, in combination, two substantially coextensive arms pivoted to each other at one end thereof, a pivot connection for said arm ends and including an elongated slot extending lengthwise of each of said arms adjacent said one end thereof, a pivot pin traversing said slots, operable means supported by said one arm and operatively connected to said pivot pin to move the latter along said elongated slot of said one arm, means pivoted on the other of said arms and provided with a slot which extends substantially perpendicularly to said elongated slots of said arms whereby said other arm may be coupled to said pivot pin and said one arm displaced by means of said pin in lengthwise direction of and relative to said other arm, a curvilinear-shaped holder for said wire to be stripped of its insulation and located at the opposite end of said other arm, a knife support provided on said one arm and mounted adjacent said opposite end, said holder terminating in two opposite jaws, each jaw having a slit for the insertion of a knife therein when received in said knife support, one of said jaws being provided with a recess located exteriorly of said one jaw, whereby insulation of said wire when inserted in said holder and rotated relative thereto may first be cut by said knife along a circumferential path, said knife terminating in a forward edge adapted to extend beyond said one jaw upon displacing of said holder and said other arm by said operable means, whereby said forward knife edge may then cut the insulation of said wire in lengthwise direction thereof while said recess is in engagement with said cut wire insulation.

5. A tool for cutting and stripping insulation from a wire core and like carrier, comprising, in combination, two substantially coextensive arms having opposite ends, a pivot connection for said arms at one of said ends and including an elongated slot extending lengthwise of each of said arms adjacent said one end thereof, a pivot pin traversing said slots, operable means supported by said one arm and operatively connected to said pivot pin to move said pin in said elongated slot of said one arm, adjusting means pivoted on the other of said arms and provided with a slot which extends substantially perpendicularly to said elongated slots of said arms whereby said other arm may be coupled to said pivot pin and said one arm moved by means of said pin in lengthwise direction of and relative to said other arm, a wire holder located at the other end of said other arm, a knife support provided on the other end of said one arm, said holder terminating in two spaced jaws, each jaw having a slit for the insertion therein of a knife mounted on said knife support, whereby insulation of said wire when inserted in said holder and rotated relative to said knife may first be cut by said knife along a circumferential path, said adjusting means including a mechanism translating a lengthwise movement into a rotative movement, and rotatable abutment means actuatable through said mechanism and positionable between said arms to adjust the distance between said knife support and said wire holder.

6. A tool for cutting and stripping insulation from a wire core and like carrier, comprising, in combination, two substantially coextensive arms having opposite ends, a pivot connection linking said arms together at one of said ends and including an elongated slot extending in and lengthwise of each of said arms adjacent said one end thereof, a pivot pin traversing said elongated slots, operable means supported by said one arm and operatively connected to said pivot pin to move the latter in said elongated slot of said one arm, adjusting means pivoted on the other of said arms and provided with a slot which extends substantially prependicularly to said elongated slots of said arms whereby said other arm may be coupled to said pivot pin and said one arm moved by means of said pin upon actuation of said operable means in lengthwise direction of and relative to said other arm, a wire holder located at the other end of said other arm whereby said wire extends across said other arm, a knife support provided on the other end of said one arm and extending in lengthwise direction thereof, said holder being slitted in lengthwise direction of said arms, whereby when a knife is mounted on said knife support, the insulation of wire when inserted in said holder and rotated relative to said knife may be circumferentially cut by the latter, said adjusting means including a mechanism having coacting movable parts for translating a lengthwise movement into a rotative movement, rotatable abutment means connected for actuation to said mechanism and positionable intermediate said arms to thereby adjust the distance between said knife support and said wire holder.

7. A tool according to claim 6, said adjusting means including a rack and a pinion, said rotatable abutment means meshing with said pinion whereby upon lengthwise movement of said rack said pinion is rotated and through the latter said abutment means is engaged for position intermediate said arms.

8. A tool according to claim 6, said operable means including a knob extending beyond said one arm for manipulating said pivot pin, a threaded bolt connected with said knob and extending longitudinally of said one arm, said pivot pin being provided with a head having a transverse threaded bore for receiving said threaded bolt, whereby displacement of said pivot pin within said elongated slots of said one arm may be effectuated.

9. A tool according to claim 6, wherein said slot of said other arm is open at one end, said slot of said adjusting means being also open at one end, whereby said slot of said other arm and said slot of said adjusting means intersect each other, and means on said other arm and on said adjusting means to position the latter relative to said other arm.

10. A tool according to claim 6, said operable means including a knob positioned rearwardly of said one arm to manipulate said pivot pin, said adjusting means including a knurled ring, and a knob for actuating said adjusting means and positioned rearwardly of said other arm and substantially below and parallel to said knob of said operable means.

11. A tool according to claim 6, including a further knife holder on said other arm, said one arm being provided with a recess opposite said knife holder of said other arm, and means for holding a knife in said further knife holder for coaction with a knife mounted in said knife holder of said other arm.

References Cited in the file of this patent

UNITED STATES PATENTS

| | | |
|---|---|---|
| 973,760 | Cirves | Oct. 25, 1910 |
| 1,011,157 | Chytraus | Dec. 12, 1911 |
| 1,977,677 | Hill | Oct. 23, 1934 |